July 7, 1931.  M. E. MITCHELL ET AL  1,813,249

TIRE GAUGE

Filed Jan. 27, 1930

INVENTORS
MALCOLM E. MITCHELL
ARTHUR F. SWAN
BY Arthur L. Slee
ATTY.

Patented July 7, 1931

1,813,249

UNITED STATES PATENT OFFICE

MALCOLM E. MITCHELL AND ARTHUR F. SWAN, OF OAKLAND, CALIFORNIA

TIRE GAUGE

Application filed January 27, 1930. Serial No. 423,804.

Our invention relates to improvements in tire gauges and the like wherein valve mechanism is arranged to normally close a main air supply passage and to be moved to open said passage as desired, said mechanism also being provided with means for directing air pressure from the tire to a pressure actuated gauge member when the valve is closed and to release the gauge actuating pressure when the valve is opened whereby the gauge may be actuated and released without disconnecting the supply connection from the tire.

The primary object of our invention is to provide an improved tire gauge.

Another object is to provide an improved tire inflating tool wherein the pressure within a tire may be gauged without disconnecting the supply connection from the tire to facilitate the inflating of automobile tires.

A further object is to provide an improved gauge and valve mechanism wherein a single valve operating member operates to control the supply of air to a tire and to direct pressure from the tire to a gauge and to release the gauge for successive operations.

Another object is to provide an improved mechanism of simple and improved construction and which is simple and efficient in operation.

A still further object is to provide an improved construction which is rugged and adapted to withstand severe usage, and in which the valve mechanism is accessible for repair or replacement.

We accomplish these and other objects by means of the improved device disclosed in the drawings forming a part of the present application wherein like characters of reference are used to designate similar parts throughout the specification and drawings and in which.

Figure 1:
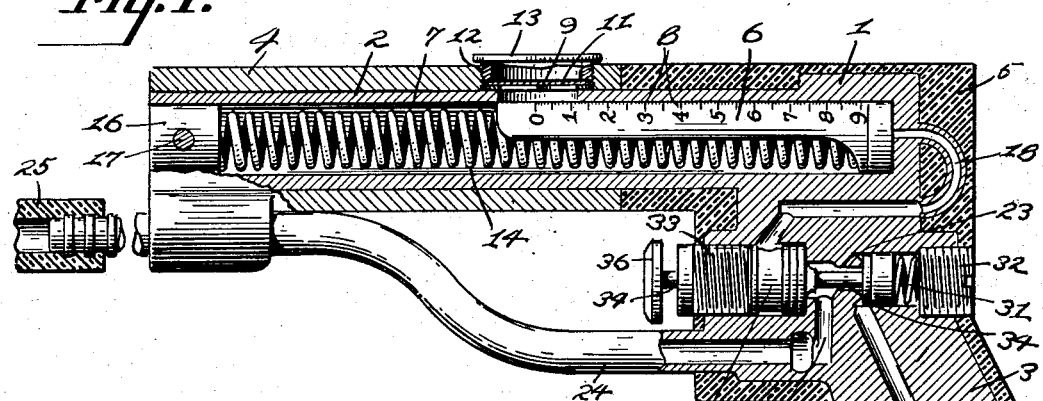
Fig. 1 is a longitudinal mid-section of our improved tire gauge, parts being shown in elevation.

Referring to the drawings, the numeral 1 is used to designate in general a body provided with a barrel portion 2 and a grip portion 3. The body 1 consists of a metal core having the outer end of the barrel encased in a suitable metal shell 4 and the grip 2 and rearward portion of the barrel core embedded in vulcanized rubber or other suitable surfacing material 5.

A gauge member 6 is slidably mounted within a cylindrical bore 7 formed in the barrel 2. The member 6 is provided with suitable calibrations 8 indicating pounds of air pressure, said calibrations being observable in relation to pointers 9 through a transparent window 11 formed in the top of the barrel 2, the pointers 9 and the window 11 being held in operative position within a recess 12 formed in the shell 4 by means of a collar 13 threaded into said recess. A spring 14 is mounted within the bore 7 to normally move the gauge member 6 rearwardly to its extreme position, the tension of the spring being designed to conform to the calibrations of the gauge member. The outer end of the spring 14 seats upon a plug 16 fitted into the outer end of the bore 7 and rigidly secured thereby by a suitable securing member 17. A gauge passage 18 is formed in the rearward end of the body to open into the bore 7 in back of the gauge member 6.

The grip portion 3 is constructed in the form of a pistol grip and is provided with a supply passage 19 having an enlarged recess 21 in the end of the grip tapped to receive a suitable air supply connection from a source of compressed air supply, not shown. The grip portion 3 is also provided with a delivery passage 22 opening into the supply passage 19 through a port 23. The passage 22 communicates with a delivery connection 24 arranged to receive a flexible connection 25, adapted to be connected to a tire valve for inflating a tire, not shown, in the ordinary manner. Recesses 26 and 27 are formed in the grip 3 upon opposite sides of the port 23 and opening outwardly upon the front and back of the grip portion respectively.

A valve member 28 is slidably mounted within the recess 26 and is arranged to engage a valve seat 29 formed at the adjacent end of the port 23. The valve is normally held in port closing position by means of a spring 31 retained by a recessed plug 32 tapped into the outer end of the recess 26.

A guide member 33 is tapped into the outer end of the recess 27. A valve operating stem 34 is slidably mounted within the guide and arranged to extend inwardly through the port 23. A knob 36 is mounted upon the outer end of the stem 34 and a shoulder 37 is formed upon the stem to be slidably received within a recess 38 formed in the guide 33, the movement of the stem 34 being limited by said knob and shoulder engaging the guide 33. A collar 39 is mounted within the recess 27 in slidable engagement with the stem 34, said collar having an internal recess 41 and also having an annular groove 42 formed upon its outer surface. A port 43 communicates between the recess 41 and the groove 42. The groove 42 forms an annular channel between the collar 39 and the wall of the recess 27 into which the gauge passage 18 opens.

Figure 3:
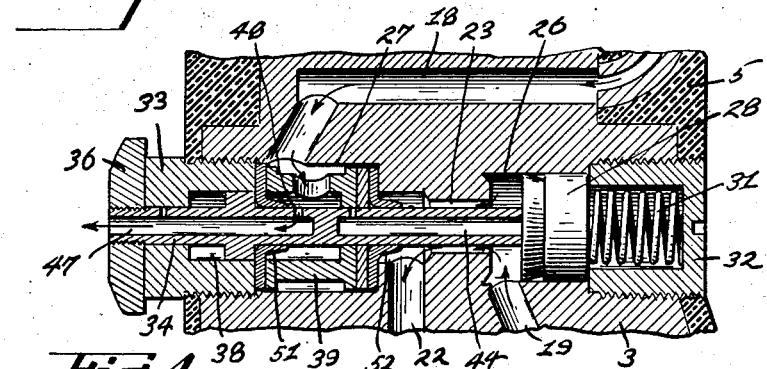
Fig. 3 is a view similar to Fig. 2 and showing the valve mechanism in tire inflating positon.
Figure 4:
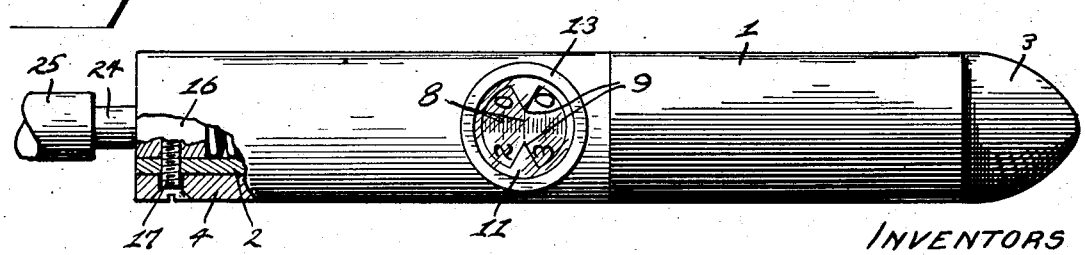
Fig. 4 is a plan view of the gauge, a portion being broken away and shown in section.

The stem 34 has its inner end normally spaced slightly from the adjacent end of the valve member 28 and is movable axially into engagement with said valve member to move said member to open position, as shown in Fig. 3 of the drawings. A gauge supply passage 44 is formed axially in the inner end of the stem 34, said passage 44 opening at the extreme end of the stem 34 and communicating with the recess 41 through a small port 46. A vent passage 47 is formed axially within the outer end of the stem 34, said passage opening outwardly to the atmosphere at the end of the stem and having a small port 48 adjacent its inner end. The passages 44 and 47 are closed from each other by a closure 49. Suitable cup washers 51 and 52 are mounted at opposite ends of the collar 39 and engaging the stem 34. The washers 51 and 52 and the collar 39 are held in operative relation within the recess 27 when the guide member 33 is tightened into the outer end of the recess 27.

In operation, the gauge member 6 is normally held in its extreme rearward position, as shown in Fig. 1, by the spring 14. The valve member 28 is held seated upon its seat 29 by the spring 31, thereby preventing the passage of air from the source of supply through the passages 19 and 22. When it is desired to inflate a tire or the like, the connection 25 is connected to the tire valve, not shown, in the ordinary manner, and the stem 34 is moved manually by pressure applied upon the knob 36 to unseat the valve member 28 and thereby permit air under pressure to be directed through the passages 19 and 22 to the delivery connection 24 and thence to the tire.

Figure 2:
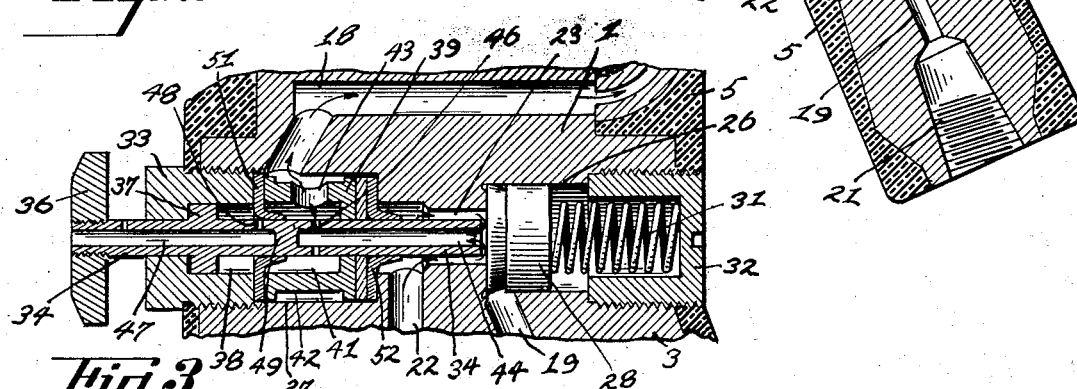
Fig. 2 is a broken sectional detail, drawn upon a larger scale, of the valve mechanism.

In moving the stem 34 to unseat the valve member 28, the opening at the end of the passage 44 seats against the valve member and closes said passage 44 and prevents the air supply from entering said passage 44, thereby preventing the gauge member 6 from being actuated by the pressure of the air supply. When it is desired to test the pressure of air in the tire, the manual pressure upon the stem 34 is released, thereby permitting the valve to be seated by the spring 31, and permitting the stem 34 to be moved outwardly sufficiently to admit air from the port 23 into the passage 44. Air under pressure from the inflated tire now passes from the port 23 upon the delivery side of the valve member 28 into the passage 44 and thence through the port 46 to the recess 41 and from there through the port 43, channel 42, and passage 18 to the back of the gauge barrel, as indicated by the arrows in Fig. 2 of the drawings. The pressure thus admitted in back of the gauge member 6 causes said member to be displaced an amount proportional to the pressure. The amount of the displacing pressure is indicated by the calibrations 8 in relation to the pointer 9 observed through the window 11.

When the stem 34 is again moved inwardly to unseat the valve member 28, the passage 44 is again closed. At the same time, the port 48 is moved inwardly past the adjacent cup washer 51 into the recess 41. The pressure by which the gauge is displaced is now released to the atmosphere through the vent passage 47, as indicated by the arrows in Fig. 3 of the drawings, thereby permitting the gauge member 6 to be returned to its normal position by the spring 14. As the valve 28 is unseated, air from the source is directed through the port 23 to be delivered to the tire.

The movement of the stem 34 to release the gauge member may be made either with the delivery connection 25 still connected to the tire for further inflating the tire, or after said connection has been disconnected. Thus, by releasing the member 34 periodically during the inflation of the tire, the pressure of inflation may be observed and a correct pressure obtained without disconnecting the device from the tire. After the tire has been fully inflated and the connection 25 removed from the tire, a momentary inward movement of the stem 34 operates to release the gauge member to normal position. Should the operator neglect to release the gauge member in this manner, the movement of the stem 34, when the tool is next used for inflating a tire, automatically releases the gauge to normal position until it is desired to again test the pressure of inflation.

The metal core structure affords an extremely rugged structure capable of withstanding severe use. The valve mechanism is fully enclosed and protected, and is readily accessible for repair or replacement of any worn parts by merely removing the plug 32 and guide 33 when desired.

While we have illustrated and described only what we regard as the preferred embodiment of our invention, various modifications may be made in the specific details of construction without departing from the spirit of our invention. We therefore desire to avail ourselves of such modifications as fall within the scope of the appended claims.

Having thus described our invention, what we claim as new and desire to secure by Letters Patent is:

1. A valve mechanism for tire gauges comprising a valve mounted in connection with a supply passage for delivering air from a source of compressed air to a tire; means normally moving the valve to closed position; and an actuating member slidably mounted in axial alinement with the valve and movable to engage and move the valve to open position, said member having a gauge supply passage formed therein and having an inlet opening at the end adjacent the valve to deliver air from the delivery side of the valve to a pressure actuated gauge member, said opening being closed by engagement with the valve when the valve is moved to open position; and a vent passage formed in the actuating member and opening to the atmosphere to release the pressure from the gauge when the actuating member is moved to valve opening position, said vent passage being closed when the actuating member is moved to normal valve closing position.

2. A valve mechanism for tire gauges comprising a valve mounted in connection with a supply passage for delivering air from a source of compressed air to a tire; means normally moving the valve to a closed position; a valve operating stem slidably mounted adjacent the valve and movable from a normal position out of engagement with the valve to valve opening position displacing the valve from its seat; a gauge supply passage formed within the stem and having an inlet opening in the end of said stem, said opening being closed by engagement with the valve when the stem is moved to valve opening position; a port opening from the gauge supply passage to deliver air from said passage to a pressure actuated gauge member; a vent passage formed in the stem and opening to the atmosphere; and a vent port opening into said vent passage, said port being normally closed when the stem is in normal position and being moved to open position to release the pressure from the gauge when the stem is moved to open to the valve.

In witness whereof, we hereunto set our signatures.

MALCOLM E. MITCHELL.
ARTHUR F. SWAN.